United States Patent [19]
Pfaffmann

[11] 3,746,825
[45] July 17, 1973

[54] SYSTEM AND METHOD FOR MEASURING INPUT ENERGY FOR AN INDUCTION HEATING INSTALLATION

[75] Inventor: George D. Pfaffmann, Cleveland, Ohio

[73] Assignee: Park-Ohio Industries, Inc., Cleveland, Ohio

[22] Filed: Sept. 30, 1971

[21] Appl. No.: 185,316

[52] U.S. Cl. .............. 219/10.77, 219/110, 323/20
[51] Int. Cl. .............................................. H05b 1/02
[58] Field of Search ................ 219/10.77, 10.75, 219/109, 110; 323/20

[56] References Cited
UNITED STATES PATENTS

| | | | |
|---|---|---|---|
| 3,240,961 | 3/1966 | Noth | 219/110 X |
| 3,389,239 | 6/1968 | Treppa et al. | 219/110 |
| 3,335,258 | 8/1967 | Barnhart et al. | 219/110 |
| 3,194,939 | 7/1965 | Hill | 219/110 X |
| 2,510,770 | 6/1950 | Bohn | 219/10.77 |
| 3,373,330 | 3/1968 | O'Brien | 323/20 X |
| 2,971,754 | 2/1961 | Seyfried | 219/10.77 X |
| 3,388,318 | 6/1968 | O'Brien | 323/20 |
| 3,190,998 | 6/1965 | Dyke | 219/10.77 X |
| 3,370,246 | 2/1968 | O'Brien | 323/20 X |

Primary Examiner—J. V. Truhe
Assistant Examiner—B. A. Reynolds
Attorney—Meyer, Tilberry and Body

[57] ABSTRACT

A system and method for measuring the energy applied to a workpiece in an induction heating installation which includes creating a power signal representative of the instantaneous power supplied to the workpiece and means for integrating the power signal with respect to time to create a resultant signal representative of the accumulated energy applied to the workpiece.

1 Claim, 4 Drawing Figures

Patented July 17, 1973         3,746,825

INVENTOR.
GEORGE D. PFAFFMANN
BY
Meyer, Tilberry & Body
ATTORNEYS

Patented July 17, 1973

INVENTOR.
GEORGE D. PFAFFMANN
BY
Meyer, Tilberry & Body
ATTORNEYS

SYSTEM AND METHOD FOR MEASURING INPUT ENERGY FOR AN INDUCTION HEATING INSTALLATION

This invention relates to the art of induction heating and more particularly to a method and apparatus for measuring the energy applied to a workpiece in an induction heating installation.

The invention is particularly applicable for use in controlling the cycle of an induction heating installation, for controlling the power applied to a workpiece in an induction heating installation during the heating cycle, and for indicating proper heating of an inductively heated workpiece and it will be described with particular reference to these applications; however, it is appreciated that the invention has much broader uses and may be employed in various induction heating situations wherein the total energy applied to the workpiece is important.

An Induction heating installation generally involves a power source for creating an alternating current, an output circuit connected to the power source, and an inductor connected through the output circuit and magnetically coupled to a workpiece being heated. Generally, the output voltage of the power source is regulated and the heating cycle is a preselected time which is adjustd for various workpieces. This technique has one disadvantage. Impedances in the output circuit and between the inductor and load are not constant. Consequently, when a fixed time cycle is employed, the actual heating of the workpiece is varied by changes in several parameters in the circuit between the power source and the work itself. This is especially noticed in radio frequency induction heating installations. To overcome this disadvantage, it has been suggested that the temperature of the workpiece could be sensed and the heating cycle could be varied accordingly. However, this approach has not been successful because of the difficulty in measuring the temperature of the workpiece and making the appropriate correction in the cycle time rapidly enough to change the particular heating operation being performed. These and other disadvantages and difficulties in controlling the heating cycle of an induction heating installation are completely overcome by the present invention which relates to a system and method for directly sensing the actual energy applied to a workpiece and using the energy applied for various control operations, such as cycle time, power control, and quality control.

In accordance with the invention, there is provided a system for measuring the energy applied to a workpiece or load in an induction heating installation including a power supply, an output circuit connected to the power supply and an inductor connected to the output circuit and magnetically coupled to the load. This system comprises means for creating a power signal representative of the instantaneous power applied to the load and means for integrating the power signal with respect to time to create a resultant signal representative of the accumulated energy applied to the load.

By employing this concept of integrating a signal representative of the instantaneous power supplied to the workpiece, the total energy actually applied to the workpiece may be measured. When the total energy reaches a certain level, the cycle is completed irrespective of the amount of time required. Consequently, if the input power raises because of parameter changes, the cycle time is decreased. In a like manner, if the input power is decreased, the cycle time increases automatically. This provides an extremely accurate arrangement for controlling the cycle time of an induction heating installation. Also, if the power supply is of the regulated type, having means for changing the effective or average output power of the power supply, a device can be used for sensing the instantaneous energy input by integrating the instantaneous power with respect to time. The output power of the power supply can be varied accordingly. Consequently, if the input energy is beyond preselected limits, the power can be changed during the actual heating cycle. This provides control over the heating operation which has not heretofore been applicable. These attributes have not been found in existing equipment for controlling the output cycle of an induction heating installation. In addition, by using the present invention, the total energy applied to the workpiece during the heating cycle can be determined and recorded. If this total energy is above or below preselected values, the workpiece can be rejected without further testing. This gives a convenient manner for determining the quality of the heating operation better than presently known arrangements.

The primary object of the present invention is the provision of a system and method of measuring the energy input to a workpiece being heated in an induction heating installation, which system and method utilizes an integration of instantaneous power being applied to the workpiece.

Another object of the present invention is the provision of a system and method for controlling the heating cycle of an induction heating installation, which system and method provides control of the actual energy input to the workpiece.

Another object of the present invention is the provision of a system and method of controlling an induction heating installation, which system and method responds to and is controlled by actual energy input to the workpiece being inductively heated.

Yet another object of the present invention is the provision of a system and method for measuring the input energy to a workpiece being heated in an induction heating installation, which system and method utilizes a signal representative of the instantaneous power being applied to the workpiece and integrates this signal with respect to time to provide an instantaneous and total representation of the energy input to a workpiece.

Another object of the present invention is the provision of a system and method for measuring the input energy to a workpiece being inductively heated, which system and method measures instantaneous power adjacent the workpiece and specifically in the circuit containing the secondary of a coupling transformer.

These and other objects and advantages of the present invention will be obvious when considering the accompanying drawings in which.

Figure 1:
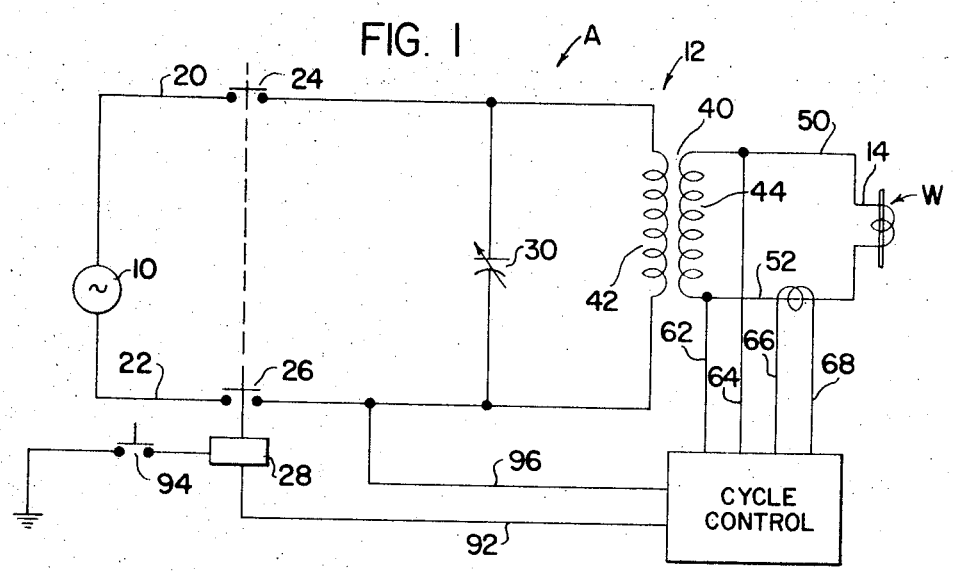
FIG. 1 is a wiring diagram showing, somewhat schematically, the preferred embodiment of the present invention.
Figure 2:
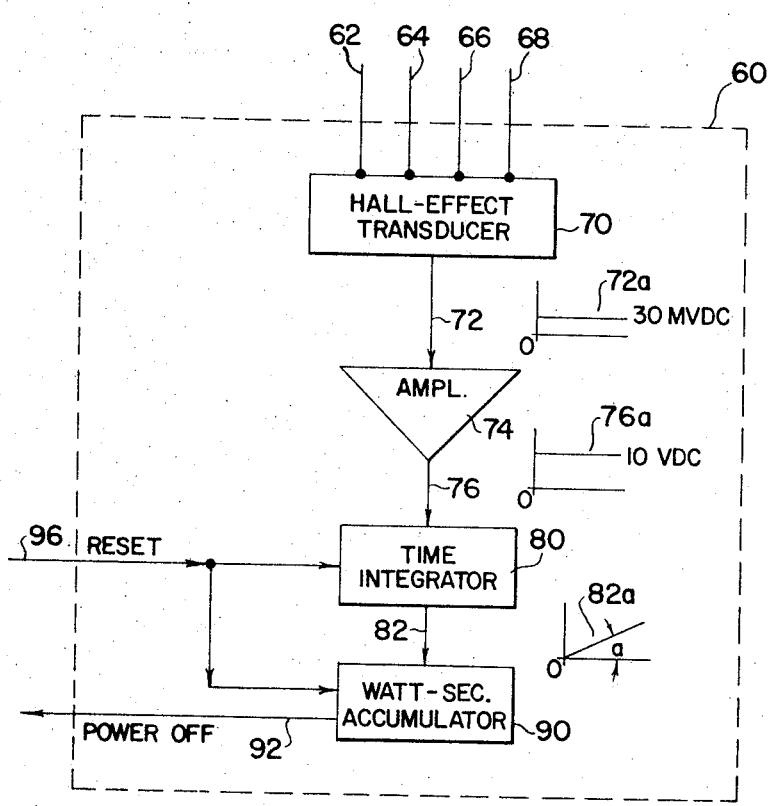
FIG. 2 is an enlarged block diagram illustrating the cycle control of FIG. 1 including the separate components and the wave forms created therein.

Referring now to the drawings, wherein the showings are for the purpose of illustrating preferred embodiments of the invention only and not for the purpose of limiting same, FIGS. 1 and 2 show an induction heating installation A including a power supply 10, output circuit 12, and inductor 14 for inductively heating the workpiece W. The output circuit of the heating installation may take a variety of forms, one of which is schematically represented in simplified fashion as leads 20, 22 having control contacts 24, 26 opened and closed by an appropriate means, such as solenoid control 28. Variable capacitor 30 is employed for adjusting the power factor of the power supply output. The output circuit also includes a coupling transformer 40 having a primary 42 and a secondary 44 the latter of which is connected to leads 50, 52 directed to opposite sides of inductor 14. As so far explained, the output circuit of FIG. 1 is a somewhat standard induction heating arrangement.

In accordance with the invention, there is provided a cycle control 60, best shown in FIG. 2. This control includes voltage sensing leads 62, 64 connected in parallel across secondary 44 and current sensing leads 66, 68 inductively coupled with lead 52. A hall-effect transducer 70 having standard known construction receives the sensed voltage and sensed current from the leads 62, 64 and the leads 66, 68, respectively. This sensed voltage and sensed current is coupled to the transducer 70 to provide an instantaneous power signal in output line 72. The wave form of this output signal 72a is a signal of a voltage proportional to the power in the secondary portion of the output circuit adjacent inductor 14. Since the output of the hall-effect transducer is relatively low value D.C. voltage, an operational amplifier 74 is employed to increase the level of the instantaneous power signal, which signal is introduced into input 76 and is illustrated as 76a. The instantaneous power signal is then applied to an integrated circuit or time integrator 80 having known circuitry for integrating the D.C. signal in line 76 with respect to time. The integrator has an output with a slope that is determined by the value of the instantaneous power signal. The level of the resultant signal is representative of the energy input to the workpiece W after a given time, and it is schematically shown as signal 82a having an angle a corresponding to the rate of power being applied to the workpiece at any given instant. The slope of the signal is shown as a constant angle a which would be the situation when a constant power is being applied to the workpiece. If the power varies during a cycle, the angle a will vary accordingly; however, the total height will still represent the actual energy applied in a given period of time.

The output signal 82a of the integrator 80 can be used for various purposes in an induction heating installation. In accordance with the embodiment illustrated in FIGS. 1 and 2, the output signal is applied to a watt-second accumulator 90 which has appropriate relays, not shown, that are actuated when signal 82a reaches a given level corresponding to the desired input energy to workpiece W. At that time, the signal is applied to an output line 92. This line actuates solenoid control 28, in any well known manner, such as energizing a coil, to disconnect the power supply 10 from the output circuit 12. This stops the heating cycle for workpiece W. The workpiece can then be removed and another workpiece inserted. Thereafter, the heating cycle is initiated by closing start switch 94. This actuates solenoid control 28 to close contacts 24, 26. Upon closing the contact, a reset signal is sent through the time integrator 80 and the watt-second accumulator 90 through line 96. It can be appreaciated that the invention, which relates to the generation of a signal representative of the instantaneous input to a workpiece and the integration of this signal with respect to time to obtain a measurement of the energy being applied to the workpiece and the total accumulated energy so applied, can be conveniently used for accurately controlling the cycle time of an induction heating installation. In this situation, the accumulator 90 is adjusted to be actuated upon receiving a resultant signal from the integrator 80 which represents the total energy applied to the workpiece. If the power fluctuates during the heating cycle, it does not affect the operation of the accumulator 90. Also, the power supply may have a variety of output powers without changing the total heating effect of the workpiece.

Figure 3:
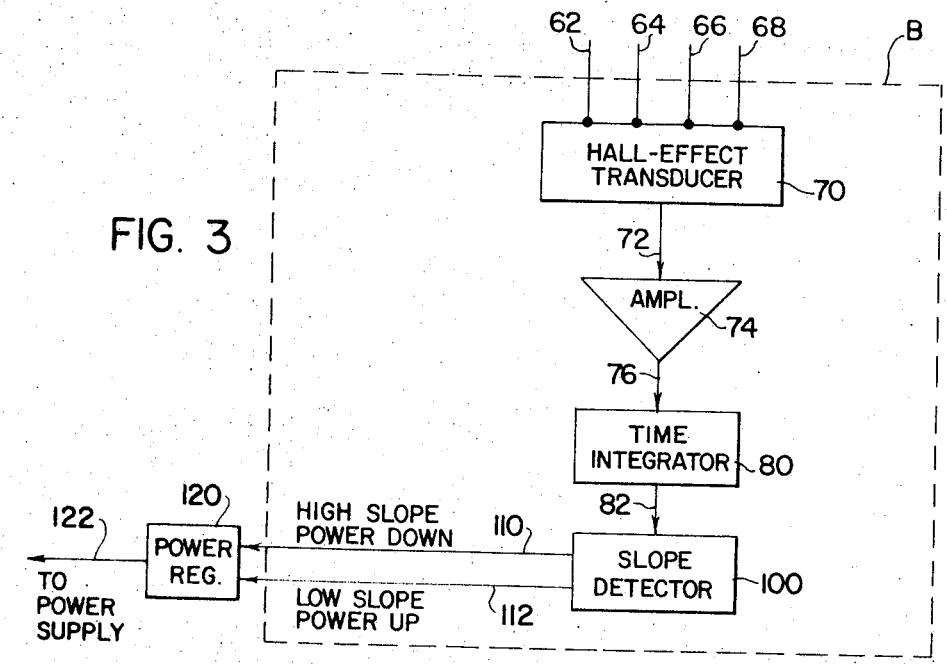
FIG. 3 is a modification of the present invention.

Referring now to FIG. 3, a further use of the present invention is illustrated as a power control unit B for use in an induction heating installation similar to that shown in FIG. 1. The same numbers are applied to FIG. 3 as those used in FIGS. 1 and 2 when identical units are employed. In this application of the present invention, the output signal from the integrator 80 is applied through line 82 to a slope detector which includes an appropriate circuitry for measuring the slope of the signal coming from the integrator at any given time. As previously mentioned, this slope is indicative of the rate at which power is being applied to the workpiece. A large slope would indicate a high power input and a small slope would indicate a low power input. Appropriate circuitry, not shown, employed with a slope detector creates a signal in line 110 when the slope of the resultant signal from line 82 is beyond a preselected value. In a like manner, if the slope is below a selected value, a signal is introduced through line 112. Lines 110, 112 are directed toward any standard power regulator unit used for induction heating power supplies. This power regulator is represented by block 120 and controls the power being applied to the workpiece through the power supply by way of a connecting control line 122. The control line may take a variety of structural forms, such as a standard device for controlling the field of a motor generator, the applied voltage of an oscillator or the conduction period of an SCR control, to name a few. In addition, the line may control the effective power by varying the time on and time off of an oscillator. The particular arrangement for controlling the power output of the power supply is not part of the present invention and may take a variety of forms. The particular form is not necessary in order to understand the use of the present invention as illustrated in FIG. 3. In operation, the power supply for the induction heating installation, as shown in FIG. 1, is regulated according to the slope of the resultant energy signal in line 82 as it is applied to detector 100. In this manner, a constant input energy can be maintained in the workpiece by regulating the power applied to the workpiece as measured in the secondary portion of the output circuit and adjacent the workpiece. In the past, control of the power supply output usually involved an attempt to maintain a constant output power, as applied as opposed to a variable output power to obtain a constant energy, as obtained by the structure schematically illustrated in FIG. 3.

The schematically represented system in FIG. 3 can also be used as an indicator of a defective heating operation. To do this, the output of the slope detector 100 can be a circuit for disconnecting the power supply when the slope of a signal from line 82 is beyond a preselected range of slopes which are considered to be acceptable in the heating of the workpiece. In this arrangement, the heating installation is turned off when the energy being applied to the workpiece is above or below a preselected value. To accomplish this, a line, such as line 92 in FIGS. 1 and 2 could be employed for actuating a solenoid control, such as solenoid control 28 in FIG. 1.

Figure 4:
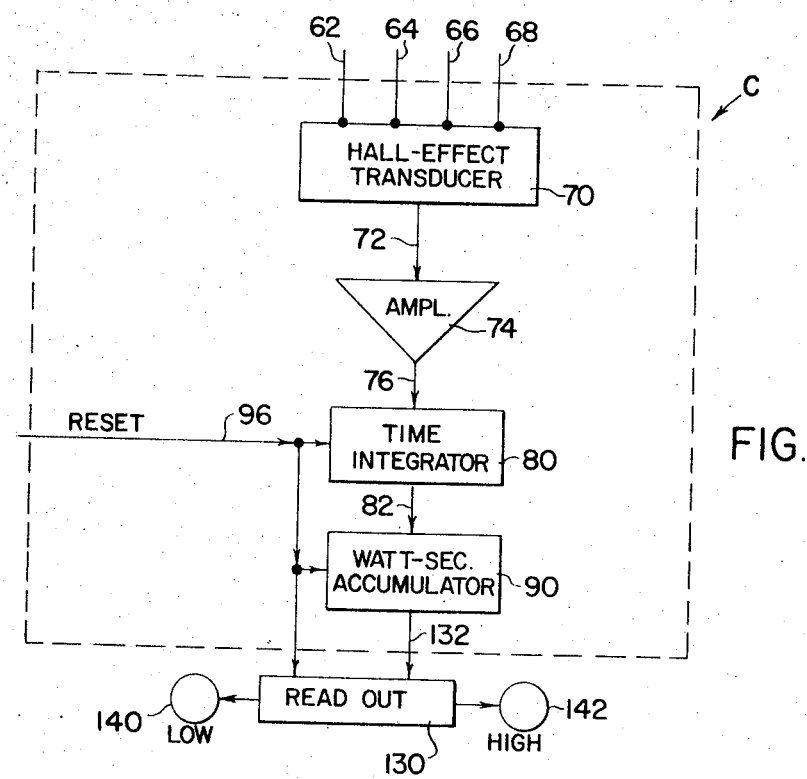
FIG. 4 is a further modification of the present invention.

In some induction heating installations it is desired to know the total energy applied to a workpiece to determine whether or not the workpiece has been properly heated. For instance, in a situation where an elongated workpiece is heated by a scanning operation wherein the power applied at various locations along the workpiece is variable, the total amount of energy applied to the workpiece is known even though the energy is applied at variable levels along the length of the workpiece. In accordance with the embodiment of the invention illustrated in FIG. 4, there is a device C for measuring the total amount of energy applied during a single heating cycle. If the total energy applied during a given cycle is above or below the range of acceptable energy input, the workpiece should be rejected. Unit C accomplishes this task by employing the basic concept of the present invention. Again, identical numbers are utilized for components and elements which correspond with the components and elements of FIGS. 1 and 2. In this application of the present invention, the watt-second accumulator 90 which measures the total amount of energy applied to the workpiece is directly coupled to a standard read-out device 130 by lead 132. The read-out device 130 graphically illustrates the total energy applied during the single heating cycle. An analog or digital read-out could be employed for this purpose. By reviewing the representation at the read-out 130, an operator can determine whether or not a workpiece has received an acceptable level of input energy. In accordance with the illustrated embodiment, the read-out device includes two indicators 140, 142 which will be activated when the total energy to a workpiece during a given cycle is below or above acceptable level, respectively. Of course, the read-out could automatically reject the workpiece when the acceptable range of energy input levels was not met.

From the above description, it is seen that the present invention can be employed in various manners to control an induction heating installation. The integrated output signal which is a slope signal representative of the input energy to the workpiece can be used to control the heating cycle, to adjust the input power, to determine whether proper heating has taken place, or to indicate a faulty heating operation. This invention could be employed for other uses in the induction heating field.

The sensed current and sensed voltage can be obtained from various positions in the output circuit 12 of the induction heating installation; however, in accordance with the preferred embodiment the sensed voltage and current is as close to the inductor 14 as possible. This is accomplished, in accordance with FIG. 1 by sensing these parameters beyond the secondary 44 of the coupling transformer 40. The integrator 80 is a standard type of electrical integrator; however, it is appreciated that when the phrase integrated with respect to time is used, the concept is that there is an output signal which represents the level of energy being applied during a given time period. Consequently, it may be possible to provide other arrangements for accomplishing this function, which arrangements would obtain the same results as an integrator. Such concepts are specifically intended to be encompassed within this disclosure.

Having thus defined my invention, I claim:

1. A system for measuring the energy applied to a workpiece in an induction heating installation including a power supply, a coupling transformer with a primary and a secondary, an output circuit having a first portion connected to said power supply and including said primary and a second portion including said secondary, and an inductor connected to said second portion and magnetically coupled to said workpiece, said system comprising means for sensing the voltage in said second portion of said output circuit, means for sensing the current in said second portion of said output circuit, means for creating a D.C. voltage signal representative of the product of said sensed voltage and current and having a level proportional to the sensed current and voltage in said output circuit, means for integrating said voltage signal with respect to time to create a resultant signal of increasing slope function representative of energy input to said workpiece, control means responsive to said resultant signal, said control means including means for interrupting power to said inductor, and said interrupting means including means for disconnecting said power supply from said output circuit when said resultant signal reaches a preselected value.

* * * * *